United States Patent [19]
Schafheutle et al.

[11] Patent Number: 5,977,247
[45] Date of Patent: Nov. 2, 1999

[54] AQUEOUS COATING COMPOSITIONS COMPRISING CURING AGENTS WHICH CAN BE DISPERSED WITHOUT SOLVENT

[75] Inventors: Markus A. Schafheutle, Hochheim; Achim Voelker, Wiesbaden; Susanne Wehner, Villmar; Gerd Walz, Wiesbaden, all of Germany

[73] Assignee: Vianova Resins GmbH & Co. KG, Mainz-Kastel, Germany

[21] Appl. No.: 08/943,696

[22] Filed: Oct. 3, 1997

Related U.S. Application Data

[62] Division of application No. 08/664,264, Mar. 22, 1996, abandoned, which is a continuation of application No. 08/416,986, Apr. 5, 1995.

[30] Foreign Application Priority Data

Apr. 15, 1994 [DE] Germany ............................ 44 13 059

[51] Int. Cl.$^6$ .................. C08J 3/00; C08J 3/02; C08K 3/20; C08L 75/00
[52] U.S. Cl. .......... 524/591; 524/501; 524/839; 524/840; 523/414; 523/415; 523/417; 428/423.1; 427/458; 427/372.2; 427/385.5
[58] Field of Search .................. 524/591, 839, 524/840, 501; 428/423.1; 427/458, 372.2, 385.5; 523/414, 415, 417

[56] References Cited

U.S. PATENT DOCUMENTS

| | | | |
|---|---|---|---|
| 3,523,925 | 8/1970 | Kamal et al. | 260/77.5 |
| 3,984,299 | 10/1976 | Jerabek | 204/181 |
| 4,238,594 | 12/1980 | Pampouchidis | 528/69 |
| 4,608,413 | 8/1986 | Nachtkamp et al. | 524/591 |
| 4,748,200 | 5/1988 | Nasu | 524/591 |
| 4,806,611 | 2/1989 | Hönel et al. | 528/45 |
| 5,283,269 | 2/1994 | Huemke et al. | 523/404 |
| 5,373,050 | 12/1994 | Morikawa et al. | 524/591 |
| 5,378,335 | 1/1995 | Hoppe-Höffler et al. | 524/901 |
| 5,483,012 | 1/1996 | Midogohchi et al. | 525/459 |

FOREIGN PATENT DOCUMENTS

| | | |
|---|---|---|
| 0 249 727 | 12/1987 | European Pat. Off. . |
| 0 524 511 | 1/1993 | European Pat. Off. . |
| 2 113 231 | 8/1983 | United Kingdom . |

OTHER PUBLICATIONS

Chemical Abstracts, vol. 115, No. 12, Sep. 23, 1991, abstract No. 116510p, Masuda et al., "Blocked Polyisocyanate Dispersions with Good Storage Stability".

Journal of Applied Polymer Science, vol. 46, No. 6, Oct. 1992, Yang et al., FTIR Analysis of Two Cationic Resins.

US Class 524 Subclass 501, Dec. 1992.

*Primary Examiner*—Patrick D. Niland
*Attorney, Agent, or Firm*—Foley & Lardner

[57] ABSTRACT

An aqueous coating composition useful as electrodeposition coatings includes (A') an aqueous dispersion of a resin (A) having functional groups which are reactive toward isocyanate, and (B') an aqueous, solvent-free dispersion of a solubilized masked polyisocyanate (B). The coating is cured by baking at a temperature which regenerates the isocyanate groups.

18 Claims, No Drawings

AQUEOUS COATING COMPOSITIONS COMPRISING CURING AGENTS WHICH CAN BE DISPERSED WITHOUT SOLVENT

This application is a division of application Ser. No. 08/664,264, filed Mar. 22, 1996, which is a continuation of application Ser. No. 08/416,986, filed Apr. 5, 1995.

BACKGROUND OF THE INVENTION

1. Field of the Invention

The invention relates to aqueous coating compositions, their preparation, and their use.

2. Description of Related Art

Since it is necessary, in order to reduce and avoid pollution, to bring about a continual reduction in the content of organic solvents, aqueous coating compositions are increasingly being employed for all functions in enhancing the quality of surfaces.

When solvent-containing coating systems are replaced by solvent-free or low-solvent systems, the advantageous performance properties of the previous solvent-containing systems and their good protective action must be retained or, where possible, exceeded.

To prepare the individual binder components of the coating compositions, it is frequently necessary for reasons of viscosity or reactivity, to employ solvents. Thus, in the synthesis of the base resins, it is preferred to use protic, such as alcohols and glycols, and aprotic solvents, such as ketones, esters, or aromatic compounds, and to use aprotic solvents in the synthesis of the crosslinking component.

As is known, however, an increase in solvent content leads, for example, in cathodic deposition coating baths, to a deterioration in the throwing power (coating of cavities), to instances of excess coating and to the increased passage of solvent into the waste water and/or the waste air. As a consequence it is necessary to remove the solvents from the binders before and/or after the step of dispersion in water, for example, by distillation or ultrafiltration. With these methods, some of the solvent remains in the dispersions, and, especially in the case of so-called stripping from the aqueous phase and in the case of ultrafiltration, relatively large quantities are produced of a solvent/water mixture which has to be disposed of or reprocessed.

The crosslinking agents of the prior art are present as a solution in organic solvents or as an aqueous dispersion, but a considerable proportion (in a typical example about 30% of the mass of the dispersion) of solvents must remain in the dispersion. This quantity of solvent is the largest component in the finished coating system which comprises, for example, binder, curing, agent and pigment paste.

SUMMARY OF THE INVENTION

An object of the present invention was, therefore, to develop curing agents, for aqueous coating compositions, which are present as solvent-free aqueous dispersions and whose properties are at least equal to those of the conventional solvent-containing systems.

It was also an object of the invention to provide aqueous coating compositions which overcome the drawbacks discussed above, and to provide methods of making and using such compositions.

In accordance with these objectives, there has been provided aqueous coating compositions comprising (A') an aqueous dispersion of a resin (A) having functional groups which react with isocyanate groups, and (B') an aqueous, solvent-free dispersion of a solubilized masked polyisocyanate (B), with the proviso that, if the polyisocyanate is cationically solubilized, it is a masked polymeric or oligomeric polyisocyanate.

In accordance with these objectives, there has also been provided a method of producing coated articles using the coating compositions, such as by electrophoretic deposition.

In accordance with these objectives, there has also been provided an article coated with the compositions of the invention, and baked to cure the coating.

Further objects, features, and advantages of the present invention will become apparent from the detailed description of the invention which follows.

DETAILED DESCRIPTION OF THE PREFERRED EMBODIMENTS

The coating compositions according to the invention can be prepared in any desired manner, for example, by mixing the dispersions (A') and (B') immediately or a short time before use. Another possibility is the mixing resin (A) and curing agent (B) in solution or in the melt, followed by conjoint dispersion of the mixture in water.

The quantities of the resin (A) and the masked polyisocyanate (B) are chosen in such way that the ratio of the number of masked isocyanate groups in (B) to the number of groups that react with isocyanate groups in (A) is between 1.2 and 0.5; preferably between 1.1 and 0.7; and most preferred between 1.05 and 0.9.

The mass fraction of solids of resin (A) in the dispersion (A') is usually between 25 and 80%, preferably between 40 and 70%. The mass fraction of organic solvent in the dispersion (A') is from 0 to 20%, preferably from 0 to 10%, while it is most preferred to keep the mass fraction of organic solvent in (A') below 5%. The mass fraction of solids of masked polyisocyanate (B) in the dispersion (B') is usually between 30 and 70%, preferably between 40 and 60%. In the preparation of the masked polyisocyanate (B), care is taken to remove the organic solvent completely if the synthesis is carried out in solution. Traces of residual solvent in the dispersion (B') are well below 1%, preferably below the detection limit by gas chromatography, calculated as mass fraction.

In order to prepare aqueous dispersions of these resins (A') and of these curing agents (B'), it is generally necessary to convert them to hydrophilic forms. This is carried out, for example, by incorporating, for example, by condensation, structural units which contain hydrophilic groups. These hydrophilic groups may be any desired cationic, anionic and/or nonionic group.

Examples of cationic groups include ammonium, phosphonium and sulfonium groups. Also useful are tertiary amino and phosphino groups which are not themselves cationic, but can be converted to cationic form, and therefore also have a hydrophilic action, by protonation with acids before or during the dispersion step.

Examples of anionic groups include carboxylate, phosphonate, phosphinate, sulfonate and sulfinate groups. They can also be produced from the corresponding (undissociated) acid groups by addition of base before or during the dispersion step.

Examples of nonionic hydrophilic groups include polyoxyalkylene groups having a low number of carbon atoms in the alkylene radical, such as polyoxyethylene or polyoxypropylene, or polar groups such as amide groups, amino groups, urea groups, and hydroxyl groups, preferably in relatively large numbers in spatial proximity.

The resins (A) may be one or more of any resin having groups which are reactive toward isocyanate groups and which are dispersible in water. For example, resin (A') may be selected from the hydroxy-functional polymers, for example, polyesters, polycarbonates, polyepoxides, hydroxy-functional polyacrylates, novolaks and alkyd resins, from amino-containing polymers such as polyamides and polyamido amines, and from mercapto-functional polymers. Also suitable are polymers which carry any two or more varieties of these functional groups in a mixture. Particular preference is given to amine-modified epoxy resins.

Suitable amine-modified epoxy resins include any in the art, such as water-dilutable amino-epoxy resins and the carbonate-amine adducts described in DE 36 44 370 and EP 272 665, both of which are incorporated by reference in their entireties. Such amino-epoxy resins generally have an amine number of from 30 to 200 (mg of KOH per g of solid resin), a hydroxyl number of from 50 to 500 (mg of KOH per g of solid resin) and a number-average molar mass (Mn) of from 250 to 10,000 g/mol, preferably from 300 to 5,000 g/mol. The lower limit of the amine number should be preferably 45, particularly preferably 70, whereas the upper limit should be preferably 150, particularly preferably 100. If the amine number is too low, then the solubility is inadequate, or an excessive degree of neutralization leads to excessively acidic pH values in the deposition baths. If the amine number is too high, then deposition produces a poorly adhering film or a blistered surface.

Examples of useful amino-epoxy resins include reaction products of epoxide-containing resins having preferably terminal epoxide groups, such as polyglycidyl ethers, and polyglycidyl esters, with polyglycidylamines containing saturated and/or unsaturated secondary and/or primary amines, and/or amino alcohols. These may be modified by at least one primary and/or secondary hydroxyl group, by the dialkylamino group and/or by a primary amino group which is temporarily protected by ketimine formation.

Amino-epoxy resins containing hydroxyl groups are advantageously obtained from polyglycidyl ethers having preferably two 1,2-epoxide groups per molecule. The term polyglycidyl ethers in the context of this invention refers preferably to those polyglycidyl ethers of the formula

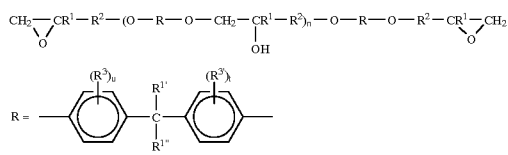

$R^1$, $R^{1'}$, $R^{1''}$ each independently, is —H or a linear or branched saturated alkyl radical having up to 8 carbon atoms, $R^2$ each independently, is a linear or branched saturated alkylene radical having up to 8 carbon atoms which may, if desired, be additionally substituted, and is preferably —CH$_2$—, $R^3$, $R^{3'}$ each independently, is H or a linear or branched saturated alkyl radical having up to 8 carbon atoms, or halogen, preferably H, n is an integer from 0 to 8, preferably from 1 to 6, and t,u each independently, is an integer from 0 to 4.

These polyglycidyl ethers generally have a number-average molar mass (Mn) of from about 300 to 5,000 g/mol and a molar mass divided by the number of epoxy groups (epoxide equivalent weight) of from about 170 to 2,500 g/mol. Examples thereof include reaction products of epichlorohydrin or methylepichlorohydrin with dihydroxydiphenylmethane (bisphenol F) or dihydroxydiphenylpropane (bisphenol A) and with dihydroxybenzophenone, dihydroxynaphthalene and/or resorcinol. Polyepoxides of suitable molar mass are prepared either by selecting the molar ratios of bisphenol and epichlorohydrin or by reacting the monomeric diglycidyl compounds with further bisphenol while adding catalysts such as Lewis acids or phosphonium salts.

The epoxy resins may be completely or partially hydrogenated. Mixtures of epoxy resins with different structures and molar masses can also be employed. In addition, for elastication, some of the polyglycidyl ether described can be replaced by aliphatic polyglycidyl ethers of the formula

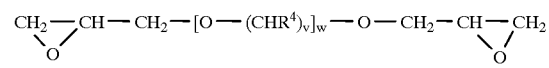

where $R^4$ is H or a lower alkyl radical with 1 to 8 carbon atoms which is provided if desired with various substituents (e.g. methyl, ethyl, i-and n-propyl, and 2-ethyl hexyl)

v is an integer from 2 to 6, w is an integer from 5 to 50.

Examples include glycidyl ethers of polypropylene glycol and polyethylene glycol.

The modified epoxy resins can also be modified by reaction with long-chain polyalcohols such as 1,6-hexanediol, neopentylglycol, bisethoxylated neopentylglycol, neopentylglycol hydroxypivalate and bis(hydroxymethyl) cyclohexane, monoanhydropentaerythritol and also polytetrahydrofurandiol, polycaprolactonediol, polycaprolactamdiol or polybutadienediol, in the presence of suitable basic or acidic catalysts such as boron fluoride/amine complexes. Whereas polyalcohols containing primary OH groups can, given suitable catalysis, be reacted directly with polyglycidyl ethers, secondary OH groups are reacted first with diisocyanate. The resulting NCO-terminated reaction product can then readily be incorporated as a bridge between 2 mol of polyglycidyl ether, with an increase in the molar mass.

A detailed listing of suitable epoxy compounds for forming the amino-modified epoxy resins useful in the present invention, can be found in the handbooks "Epoxidverbindungen und Harze" [Epoxide Compounds and Resins] by A. M. Paquin, Springer Verlag, Berlin 1958, chapter iv, and "Handbook of Epoxy Resins" by H. Lee, K. Neville, McGraw-Hill Book Company, New York 1982 reissue, and "Epoxy Resin Chemistry and Technology" by C. A. May, Marcel Dekker Inc., New York and Basel 1988, each of which is incorporated by reference.

The epoxy resin may also be modified with saturated or unsaturated polycarboxylic acids and/or hydroalkyl carboxylic acids. Examples of aliphatic, cycloaliphatic, and/or aromatic polycarboxylic acids of various chain lengths include adipic acid, sebacic acid, fumaric acid, isophthalic acid, and dimeric fatty acids. Hydroxyalkyl carboxylic acids include lactic acid, dimethylolpropionic acid. Polyesters which contain carboxyl and hydroxyl groups can also be used as modifiers. The reaction of excess polyglycidyl ether of low molar mass with polycarboxylic acids and/or polyalcohols produces, as intermediate stage, modified polyglycidyl ethers, which are then reacted further with amines and/or amino alcohols.

It is also possible to use heterocyclic polyepoxide compounds, such as 1, 3-diglycidyl-5,5-dimethylhydantoin, triglycidyl isocyanurate, or diepoxides formed from bisimides. Another suitable class of polyepoxides comprises polyglycidyl ethers of phenolic novolak resins, whereby the functionality may be increased from 2 up to about 6 glycidyl groups per molecule. By defunctionalizing with long-chain alkylphenols such as dodecylphenol it is possible in addition to incorporate elasticizing elements. Polyglycidyl esters of polycarboxylic acids, such as diglycidyl hexahydrophthalate, diglycidyl tetrahydrophthalate, or diglycidyl fumarate, can also be used.

The amino groups are introduced into the epoxide compounds to give the amino-modified resins in any desired manner, for example, either by addition of NH-reactive compounds onto the epoxide group or by reaction of hydroxyl groups of the base epoxy resin with basic monoisocyanates, which are formed by reaction of aromatic and/or aliphatic and/or cycloaliphatic diisocyanates or polyisocyanates with a dialkylaminoalkanol (cf. DE-A-27 07 405 which is incorporated by reference).

Any desired method can be used so long as amino groups are introduced into the epoxide. Compounds used as NH-reactive compounds include primary amines such as methylamine, ethylamine, propylamine, butylamine, octylamine, monoethanolamine, 2-ethylhexylamine, dimethylaminopropylamine, diethylaminoethylamine, dimethylaminoneopentylamine, or methoxypropylamine and/or, preferably, secondary amines such as dialkylamines, monoalkylhydroxyalkylamines, or dihydroxyalkylamines. Examples of such compounds include dimethylamine, diethylamine, dipropylamine, dibutylamine, methylbutylamine, dimethylaminopropylamine, N-methylaminoethanol, or diethanolamine, and cyclic amines such as morpholine or oxazolidine. When primary amines are employed, the amine reacts—depending on the stoichiometric ratios available—with from 1 to 2 epoxide groups, with enlargement of the molecule.

It is also useful to employ primary amines of the formula

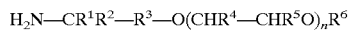

$$H_2N-CR^1R^2-R^3-O(CHR^4-CHR^5O)_nR^6$$

or secondary amines of the formula

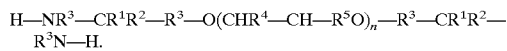

$$H-NR^3-CR^1R^2-R^3-O(CHR^4-CH-R^5O)_n-R^3-CR^1R^2-R^3N-H.$$

In these formulas, $R^1$ and $R^2$ are hydrogen, alkyl or —$CH_2$—OH groups, $R^3$ is a linear or branched alkylene radical, especially an alkylene radical having 1 to 3 carbon atoms, $R^4$ and $R^5$ are independently hydrogen or alkyl radicals having 1 to 4 carbon atoms, $R^6$ is hydrogen or an alkyl, cycloalkyl, or phenyl radical, preferably an alkyl radical having 1 to 6 carbon atoms, and n is an integer from 0 to 5. Examples of such monoamines include ethanolamine, propanolamine, butanolamine, ethylene glycol 2-aminoethyl ether ($H_2$—$CH_2$—$CH_2$—O—$CH_2$—$CH_2$—OH), and diethylene glycol mono (3-aminopropyl) ether ($H_2N$—$(CH_2)_3$—O—$CH_2$—$CH_2$—O—$CH_2$—$CH_2$—OH).

When primary amines are employed, the amine reacts with the epoxide group in dependence on the stoichiometric ratios available, with enlargement of the molecule. Examples of diamines include the Jeffamine® M series, the Jeffamine® D series, and the Jeffamine® ED series.

Other suitable modifying compounds include diamines or triamines containing primary and/or secondary amino groups, for example, laurylpropylenediamine and tallow fatty-propylenediamine.

With secondary diamines, chain extension occurs. Secondary diamines which are useful include preferably long-chain diamines and include N,N'-dialkyldiaminoalkanes such as N,N'-bis(isohexyl)-1,6-diaminohexane, N,N'-bis(isohexyl)isophoronediamine, N,N'-bis(isohexyl) dimethylhexamethylenediamine, N,N'-bis(isohexyl)-2-methylpentamethylenediamine, N,N'-bis(isohexyl) ethylenediamine, and N,N'-bis(isohexyl)di(4-aminocyclohexyl)methane.

Also useful are reaction products of saturated glycidyl ethers or glycidyl esters or epoxyalkanes with primary diaminoalkanes, such as the addition product of 1,6-hexanediamine or 2-methylpentamethylenediamine with 2 mol of a glycidyl ester of Versatic acid (αbranched monocarboxylic acids, preferably $C_9$–$C_{11}$).

Monoepoxides which can be employed for this purpose are also saturated or unsaturated glycidyl ethers or α-epoxides of various chain lengths, such as 1,2-dodecene oxide or butylene oxide. In this context, the suitable number of hydroxyl groups on the one hand comes automatically from the epoxide group on addition of the secondary amino groups, while on the other hand it can be controlled by using hydroxyalkylamines. Further possibilities for use as secondary diamines are the reaction product of 2 mol of 2-ethylhexylamine with 1 mol of Beckopox® EP 075 (a diglycidyl ether based on propylene oxide) and/or 1 mol of Beckopox® EP 140, and also aliphatic secondary diamines based on propylene oxide adducts of diols or triols, such as Novamin® grades.

The molar ratios between compounds containing epoxide groups and compounds containing amino groups should be chosen so as to ensure the complete incorporation of the amine, since otherwise rupture-type surface defects may occur in the course of electrophoretic coating; in other words, a slight excess of epoxide groups is advantageous.

It is possible to react all of the amines simultaneously with the epoxide groups, or else a stepwise procedure may be adopted. Usually, the reaction of the amines begins even at room temperature and is generally exothermic. In order to attain complete reaction, it is generally necessary to increase the temperature temporarily to from about 50 to 120° C.

For the preparation of the amino-epoxy resin, an advantageous procedure is one in which the epoxy resin is first of all dissolved in a solvent and then reacted with the amines.

In a particularly preferred preparation variant, the dissolved epoxy resins are metered into a mixture of the appropriate amines, bisphenol A, and solvent.

For crosslinking reactions, a functional group, such as a hydroxyl group, must always be present in the amino-epoxy resin. When the functional groups are the preferred hydroxyl groups, the hydroxyl number present in the molecule (measured as mg of KOH per gram of solid resin) determines the crosslinking capacity of the film. It should be greater than 50, preferably greater than 100 and with particular advantage greater than 150. The upper limit of the hydroxyl number is generally 500, or more advantageously below 300. If the hydroxyl number is too low, then crosslinking gives rise to films which are still soluble in organic solvents such as methyl ethyl ketone. If, on the other hand, the hydroxyl number is too high, the film becomes excessively brittle and may also remain too hydrophilic. The molecule should preferably contain at least two crosslinkable, preferable primary, hydroxyl groups.

The primary and/or secondary hydroxyl groups which are important for the crosslinking process may be partially replaced by primary and/or secondary amino groups. The introduction of primary amino groups into the basic epoxy resin structure is carried out preferably by reacting resins which contain at least one, preferably at least two, epoxide groups per molecule with an amino- and/or hydroxyl-containing ketimine and/or aldimine and/or polyamine. The ketimines or aldimines (Schiff bases) are prepared by known methods, i.e., by condensation, with elimination of water, from the corresponding polyamines having the general structure H—NR—R—NH$_2$ or the corresponding amino alcohols having the general structure HO—R—NH$_2$ and the suitable aliphatic ketones such as diethyl ketone, methyl isobutyl ketone, ethyl n-propyl ketone or alternatively cyclopentanone, cyclohexanone, acetophenone, and the like, or suitable aldehydes such as acetaldehyde, butylaldehyde, valeraldehyde, and o-tolualdehyde. Preferred ketimines are reaction products of methyl isobutyl ketone and diethylenetriamine. The reaction conditions (reaction temperature, choice of solvent) are chosen such that no substances which decompose the ketimine bond, such as water, remain present in the reaction product.

The ketimine or aldimine protects the primary amino group (cf. U.S. Pat. No. 3,523,925) so that the amine can be reacted with the basic epoxy resin by way of another functional group, for example, a hydroxyl group or, preferably, a secondary amino group. The molar ratios of the components employed should preferably be chosen so as to ensure that no unreacted, low molecular weight amine remains in the batch, since otherwise rupture-type surface defects may occur in the course of electrophoretic coating. The reaction of the secondary amino groups of the polyamino ketimine with the epoxide group begins even at room temperature and is generally exothermic. In order to attain complete reaction, it is generally necessary to increase the temperature temporarily to from 50 to 120° C.

The curing agents (B) of the present invention carry isocyanate groups which react with the functional groups of the resins (A) to form compounds. So that this reaction does not take place prematurely (e.g., during storage, if a one-component system is used), the reactive groups of the curing agent may be reacted beforehand with compounds which are readily eliminated again at the baking temperatures of the coating composition, such as more than 110° C. to less than 210° C., preferably less than 190° C. and especially less than 180° C. (these compounds are called masking or blocking agents), to reconstitute the reactive groups of the curing agent. These groups then react with the functional groups of the resin to form a coating which thereafter is generally no longer meltable and is insoluble.

Suitable curing agents for the invention are any which contain isocyanate groups which can be dispersed in an aqueous solvent-free dispersion. Preference is given to blocked or masked isocyanates which, after the elimination of the masking agent, react with the functional groups of the resin to form urethanes, ureas, or thiourethanes. Any masked isocyanates or mixtures thereof can be used as the curing agents.

The masked polyisocyanates (B) which are solubilized in accordance with the invention are prepared, for example, by reacting a polyisocyanate (B1) in bulk or in the melt with a polyhydric alcohol (B2) and a masking agent (B4), in which case it is possible, if desired, to add basic catalysts such as tertiary amines or small quantities of tin salts, such as dibutyltin dilaurate. The quantities are preferably chosen such that not all the isocyanate groups are reacted. The isocyanate groups which have remained are then preferably reacted with a solubilizing compound (B3) selected from (i) compounds containing at least one quaternary ammonium, phosphonium or sulfonium group and at least one primary or secondary amino group or hydroxyl or mercapto group, or amines or phosphines containing at least one tertiary amino or phosphino group and at least one hydroxyl, primary or secondary amino or mercapto group (B3-c, cationic solubilization); hydroxy, amino, or mercapto acids (B3-a, anionic solubilization); and organic hydroxy, amino, or mercapto compounds containing a hydrophilic nonionic structural element (B3-n). Examples of suitable hydrophilic structural elements include polyoxyalkylene polyethers in which alkylene represents 1,2-ethylene, 1,2-propylene or mixtures of these groups, a plurality of hydroxyl groups on adjacent carbon atoms, or other hydrophilic groups such as, for example, urea groups.

The quantities of the components (B1) through (B4) are chosen in such way that the content of ionic groups or non-ionic solubilizing groups in the masked polyisocyanate (B) is from 2 to 200 mmol per 100 g, preferably from 4 to 150 mmol/(100 g), and especially preferred from 5 to 120 mmol/(100 g).

In the case of cationic solubilization, the quantities of components (B1), (B2), (B3) and (B4) are generally chosen such that (B) ultimately has an amine number of from 5 to 40, preferably from 10 to 30 and with particular preference from approximately 17 to 25, mg of KOH per gram of masked polyisocyanates.

The solubilized, masked polyisocyanates are then converted to an aqueous dispersion, the solubilizing groups being converted partially or completely into the ionic form before or during the dispersion by addition of acids (in the case B3-c) or alkalis (in the case B3-a).

Polyisocyanates (B1) which are suitable for the invention include any aliphatic, cycloaliphatic, and/or aromatic polyisocyanates having at least two isocyanate groups per molecule. Suitable aromatic diisocyanates include the isomers or isomer mixtures of phenylene diisocyanate, tolylene diisocyanate, xylylene diisocyanate, biphenylene diisocyanate, naphthylene diisocyanate, and diphenylmethane diisocyanate; diphenyl tetraisocyanate, preferably naphthyl tetraisocyanate, tolylene diisocyanate, and xylylene diisocyanate. Owing to their good resistance to ultraviolet light, (cyclo)aliphatic diisocyanates give rise to products having a low tendency to yellowing. Examples of such diisocyanates are isophorone diisocyanate, cyclopentylene diisocyanate, and the hydrogenation products of aromatic diisocyanates, such as cyclohexylene diisocyanate, methylcyclohexylene diisocyanate and dicyclohexylmethane diisocyanate, and also aliphatic diisocyanates of the formula

$$O=C=N-(C\ R_2)_r-N=C=O$$

in which r is an integer from 2 to 20, especially from 6 to 8, and R is hydrogen or a lower alkyl radical having 1 to 8 carbon atoms, preferably 1 or 2 carbon atoms. Examples of such compounds include trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate, and trimethylhexane diisocyanate. Particular preference is given to diphenylmethane diisocyanate and tolylene diisocyanate, and isomer mixtures thereof, and also isophorone diisocyanate, dicyclohexylmethane diisocyanate, trimethylene diisocyanate, tetramethylene diisocyanate, and hexamethylene diisocyanate.

Vinyl polymers which contain isocyanate groups and are formed by copolymerization of, for example, isocyanatoethyl (meth) acrylate or dimethylisopropylbenzyl isocyanate with alkyl (meth)acrylates and/or (alkyl)vinylbenzenes can also be used as polyisocyanate (B1). Likewise, mixed aliphatic/aromatic isocyanate compounds are suitable.

In the case of the cationically solubilized, masked polyisocyanates, it has surprisingly been found that the process according to the invention can be employed in the absence of solvents only if oligomeric or polymeric isocyanates are employed. Examples of such oligomeric or polymeric isocyanates include the dimeric (uretdiones) and trimeric isocyanates (cyanurates), the allophanates and biurets which result from the reaction of ready-formed urethanes with unreacted isocyanate, and polymeric isocyanates based on diphenylmethane diisocyanate. If monomeric isocyanates are employed in this case, then the reaction products cannot be converted into the form of fine dispersions. Instead, coarse dispersions which gel rapidly are obtained.

For the masking or blocking of the isocyanates, conventional masking agents (B4) are employed. Any such masking agents can be used. Particularly useful compounds, which block the isocyanates, contain only one free amine, amide, lactam, mercapto, or hydroxyl group. Examples of compounds which have proven suitable for this purpose include aliphatic or cycloaliphatic alcohols such as methanol, ethanol, propanol, butanol, pentanol, hexanol, 2-ethylhexanol, and 2-pyridylcarbinol, dialkyl-amino alcohols such as dimethylaminoethanol, oximes such as methyl ethyl ketoxime, lactams such as ε-caprolactam or 2-pyrrolidone, imides such as phthalimide or N-hydroxymaleimide, hydroxyalkyl esters, malonic esters, or acetoacetic esters. Mono- or oligoalkylene glycol monoethers such as β-hydroxyglycols or β-hydroxyglycol ethers and glycol amides are also recommended. Particular preference is given to ethylene glycol monobutyl ether and diethylene glycol monobutyl ether and to ketoximes, for example, the oximes of lower aliphatic ketones such as acetone or butanone.

The polyhydric alcohols (B2) carry at least two hydroxyl groups. Any such alcohols or mixtures thereof can be used. Polyoxyalkylenediols, aliphatic and cycloaliphatic alcohols having 3 to 8 carbon atoms and at least two hydroxyl groups, and reaction products thereof with ethylene oxide or propylene oxide, or mixtures thereof, are preferred. Examples of suitable alcohols include ethylene glycol, propylene glycol, neopentyl glycol, polyethylene glycols and polypropylene glycols, and copolymers thereof, glycerol, erythritol, pentaerythritol, hexanetriol, dipentaerythritol, and trimethylolethane and trimethylolpropane.

The cationically solubilizing compounds (B3-c) are compounds containing at least one tertiary amino group and at least one functional group selected from hydroxyl, mercapto, and primary and secondary amino groups. Any such compound can be used. Particular preference is given to polyamines which contain 2 to 10 carbon atoms and at least one tertiary and at least one primary or secondary amino group. The primary or secondary amino group reacts with an isocyanate group of (B1) to form a urea group. In this reaction, the tertiary amino group may act as catalyst. By protonation with acids it is transformed into an ammonium group and thereby enables emulsifier-free dispersion of the curing component (B). Examples of suitable polyamines include 3-dimethylamino-1-propylamine, N,N-dimethylethylenediamine, N,N,N'-trimethylethylenediamine, N,N'-bis(3-aminopropyl)piperazine, 1-amino-4-methylpiperazine, N-(2-aminoethyl)piperazine, and N-(2-aminoethyl)piperidine.

Other suitable (B3-c) compounds include those which carry one or more hydroxyl groups or one or more mercapto groups in each case together with one or more tertiary amino groups. Examples include triethanolamine and captamin. Also suitable are compounds which contain not only the tertiary amino groups but also two or more different isocyanate-reactive groups selected from among hydroxyl, mercapto, and primary and secondary amino groups. Examples are 1-amino-4-(2-hydroxyethyl)piperazine, 2-mercapto-3,4,5,6-tetrahydropyrimidine, and 3-mercapto-1,2,4-triazole. It is also possible to employ compounds which carry at least one quaternary ammonium or phosphonium or tertiary sulfonium group and at least one isocyanate-reactive group, for example, choline chloride (N-2-hydroxyethyltrimethylammonium chloride), in which case the acidification before, during or after the dispersion step is omitted.

The anionically solubilizing compounds (B3-a) are compounds which contain at least one isocyanate-reactive functional group, selected from among hydroxyl, mercapto, and primary and secondary amino groups, and at least one acid group. Any such compound may be used. The acid group may be selected from among carboxyl groups, phosphonic and phosphinic acid groups, and sulfonic and sulfinic acid groups. Examples of suitable compounds include amino acids such as glycine, alanine, β-alanine, cysteine, cysteic acid, lysine, taurine, serine, hydroxy acids such as glycolic acid, glyceric acid, lactic acid, isethionic acid (hydroxyethanesulfonic acid), hydroxymethanesulfinic acid, 1- and 2-aminoethanephosphonic acid. In this case too, the compounds can be employed in the form of salts, in which case the addition of alkali can be omitted.

The nonionically solubilizing compounds (B3-n) contain at least one functional group selected from among hydroxyl, mercapto, and primary and secondary amino groups, and at least one hydrophilic structural element, preferably selected from the group consisting of polyoxyalkylene ethers having 2 or 3 carbon atoms in the alkylene radical and mixtures thereof. Particular preference is given to polyoxyalkylenediols and polyoxyalkylenediamines. Examples include polyethylene glycols and polypropylene glycols and their monoethers, and the polyoxyalkyleneamines which are known under the trade names Jeffamine® and Novamin®. Other suitable examples include low molecular weight polyethyleneimines which are available from BASF under the name Polymin®.

From the resins (A) and the curing agents (B), it is possible to produce suitable one-component coating compositions by mixing components (A) and (B) in solution or, preferably, in bulk or in the melt at temperatures below the temperature at which the masking agents are eliminated. If desired, the solvent is then removed, for example, by distillation or by diffusion, and the mixture is converted into a hydrophilic form, if required, by addition of acid or base and is then dispersed in water.

For a two-component system, the resin (A) and the curing agent (B) may also be converted to separate dispersions (A') and (B') by rendering each of the components hydrophilic, separately, by addition of acid or base and then dispersing them in water. The dispersions can then be mixed with one another directly or a short time before use.

The dispersions according to the invention are outstandingly suitable as ionically stabilized waterborne binders. It is particularly preferred to process them further to give electrodeposition coating materials, by adding to the aqueous binder dispersion pigments such as titanium dioxide and carbon black and, if desired, catalysts, both of which can preferably be introduced by way of an aqueous pigment paste. Using the coating compositions according to the invention it is also possible to produce stoving enamels. Any desired additives in any desired amount may be used to give the desired coating material.

The preparation of pigment paste is part of general knowledge in the art and requires no further description here. See in this respect, for example, D. H. Parker, Principles of Surface Coating Technology, Interscience Publishers, New York (1965); R. L. Yates, Electropainting, Robert Draper Ltd., Teddington/England (1966); and H. F. Payne, Organic Coating Technology, Volume 2, Wiley and Sons, New York (1961).

The invention is illustrated in more detail by the examples which follow. These examples are meant to illustrate the invention, but in no way limit the invention.

EXAMPLE 1

Curing Agent 5.89 mol of Desmodur VL® (mixture of monomeric and oligomeric 2,4'- and 4,4'-diphenylmethane diisocyanate) are metered in over 4 hours at 80° C. to an initial charge of 2 mol of diethylene glycol monobutyl ether, 5.66 mol of butylglycol and 1.13 mol of trimethylolpropane. After an NCO value of 2.6% has been reached, 0.75 mol of N,N-dimethylaminopropylamine is added. The temperature of the reaction mixture rises to about 110° C. After it has been cooled to 95° C., 0.6 mol of formic acid is added in the form of a 50% strength aqueous solution, and is stirred in. Subsequently the batch is dispersed with deionized water and adjusted to a solids content of 55%.

EXAMPLE 2

Curing Agent 1 mol of Voranol® P 400 (polyoxypropylene glycol) is added over 7 min at 50° C. to an initial charge of 10.2 mol of Desmodur VL®. After 0.5 hour at 60° C., a mixture of 11.1 mol of butylglycol and 1.9 mol of trimethylolpropane is metered in over the course of 0.5 hour. 10 min later, 1.68 mol of N,N-dimethylaminopropylamine are added and stirred in. The mixture heats up to 110° C. Stirring is continued until the NCO value has reached 0%. After the reaction mixture has cooled to 95° C., 1.38 mol of formic acid are added in the form of a 50% strength aqueous solution, and the reaction mixture is subsequently diluted with deionized water to a solids content of 50%.

EXAMPLE 3

Amino-epoxy Resin 42 g of diethanolamine are metered at 40° C. into a solution of 566.4 g of a polyglycidyl ether based on bisphenol A and having an epoxide equivalent weight of 472 g/mol in 322 g of methoxypropanol and 52.6 g of Texanol® (2,2,4-trimethyl pentanediol-1,3 monoisobutyrate) in a reaction vessel equipped with stirrer, thermometer, dropping funnel and reflux condenser. Subsequently, 20.4 g of dimethylaminopropylamine and 123.2 g of an adduct of 116 g of 1,6-diaminohexane with 500 g of Cardura® E 10 (glycidyl ester of an α-branched monocarboxylic acid having 9 to 11 carbon atoms) are added at 40 to 50° C. and the solution is slowly heated to from 90 to 100° C. To complete the reaction the temperature indicated is maintained for 3 hours more. The epoxide content is then zero. The resin has:

Amine number: 98 (mg of KOH/g of solid resin)

Solids content: 70% by mass

EXAMPLE 4

Binder Formed From Resin and Curing Agent

The amino-epoxy resin of Example 3, heated at from 90 to 100° C., is initially introduced into a reaction vessel equipped with stirrer, thermometer, dropping funnel and reflux condenser and is subjected to a vacuum distillation. As soon as the total quantity of solvent has been stripped off, the mixture is cooled to 90 to 95° C. This mixture is neutralized with 85% strength formic acid. Subsequently, the quantity of demineralized water indicated below is mixed in. Dispersions 1 and 2 are obtained in accordance with this general procedure.

TABLE 1

Composition of the dispersions

|  | Dispersion 1 | Dispersion 2 |
|---|---|---|
| Amino-epoxy resin | 766 g | 766 g |
| Curing agent | 268 g | 268 g |
|  | (Example 1) | (Example 2) |
| Formic acid (85% strength) | 11 g | 11 g |
| Water | 1482 g | 1865 g |
| Solids content by mass (measured after 1 h, 125° C.) | 35% | 30% |

EXAMPLE 5

1708 parts (4 mol) of Denacol® EX-145 (penta (oxyethylene glycol) α-phenyl ω-glycidyl ether) are added over one hour at from 60 to 80° C. to a solution of 204 parts (2 mol) of N,N-dimethylaminopropylamine in 1224 parts of ethoxypropanol; the reaction mixture is subsequently maintained at from 80 to 100° C. until epoxide is no longer detectable (amine number about 117 mg of KOH/g; solids content about 50% by mass).

EXAMPLE 6

540 parts of isooctadecyl alcohol and 0.9 part of dibutyltin dilaurate are added over one hour at from 40 to 60° C. to 348 parts of Desmodur® T 80 (80%, 2,4-, 20% 2,6-tolylene diisocyanate) in 296 parts of xylene, and then the reaction mixture is maintained at this temperature until an NCO value of about 9.5% is reached (solids content about 75% by mass).

EXAMPLE 7

1280 parts (2 equivalents of epoxide) of Beckopox® SEP 311 (75% strength in xylene) are heated to 80°C. 1184 parts of the urethane of Example 6 (75% strength) are added to this solution over one hour, and the reaction mixture is maintained at 80° C. until free isocyanate is no longer detectable. The solvent is subsequently distilled off in vacuo. The batch is diluted to about 60% with 1232 parts of ethoxypropanol. EXAMPLE 8

Paste Resin 2460 parts of the adduct prepared in Example 7 are introduced into the solution of Example 5, and this mixture is maintained at from 60 to 80° C. until the acid number and the epoxide content have fallen to zero. Subsequently the solvent is removed in vacuo, and then 128 parts of butylglycol and 400 parts of 90% strength lactic acid are added. Dispersion is carried out by continuous addition of 2250 parts of deionized water, to give a solids content of 55% by mass.

EXAMPLE 9

Pigment Paste 14 parts of the binder of Example 8, 3 parts of Texanol, 1 part of 50% strength acetic. acid and 2 parts of a 1:1 mixture of 2,4,7,9-tetramethyl-5-decyne-4,7-diol (Surfynol® 104, wetting agent) and Sektol® are initially introduced into a vessel fitted with a stirrer. 3.5 parts of dibutyltin oxide, 0.3 part of carbon black, 38 parts of titanium dioxide, 0.6 part of Aerosil® and 38 parts of deionized water are metered into this mixture with stirring. After stirring for one hour, the pigment paste mixture is cooled and milled for 1 hour in a bead mill (SAZ beads: 0.1 mm).

EXAMPLE 10

CED Paints 1 and 2

1270 parts of each binder dispersion (dispersions 1 and 2) are placed in a glass beaker equipped with stirrer and diluted with 2400 parts of deionized water. Subsequently 420 parts in each case of the pigment paste prepared in Example 9 are added.

EXAMPLE 11

Deposition Results

Coating was carried out onto bright iron panels connected as cathode at 225 V for 2.5 minutes at a bath temperature of 32° C.; the panels were then rinsed off with water and baked at 170° C. for 30 minutes. The baked films showed a dry film thickness of 20 $\mu$m and no craters.

Table 2 summarizes the performance results of the lead-free CED paint formulations:

TABLE 2

Test results for the CED paints

| Paint | Erichsen indentation (mm) | Acetone resistance test | Impact test (in · lb) | Salt spray test (240 h) | Seiving residue (3 weeks) |
|---|---|---|---|---|---|
| 1 | 7.5 | >1 min | >80 | <1.5 mm | <50 mg/l |
| 2 | 7.8 | >1 min | " | " | " |

Other embodiments of the invention will be apparent to those skilled in the art from consideration of the specification and practice of the invention disclosed herein. It is intended that the specification be considered as exemplary only, and not to limit the present invention.

What is claimed is:

1. A method of making an aqueous coating composition comprising:
    forming an aqueous dispersion (A') of an amino-epoxy resin (A) having functional groups which react with isocyanate groups, and
    forming an aqueous, solvent-free dispersion (B') of a solubilized masked polyisocyanate (B), wherein the polyisocyanate (B) comprises a cationically solubilized masked polyisocyanate (Ba) or an anionically solubilized masked polyisocyanate (Bb),
    wherein the cationically solubilized masked polyisocyanates (Ba) is made by reacting in bulk or in the melt,
        (Ba1) a polymeric or oligomeric polyisocyanate,
        (Ba2) a polyhydric alcohol,
        (Ba3) a compound (B3c) containing at least one quaternary or sulfonium group, or tertiary amino group or phosphino group and at least one isocyanate-reactive functional group selected from the group consisting of hydroxyl, mercapto, and primary and secondary amino groups, and
        (Ba4) a masking compound which contains at least one active hydrogen atom and which is eliminated at baking temperatures,
    wherein the quantities of (Ba1), (Ba2), (Ba3) and (Ba4) are selected such that the amine number of the product (Ba) is from 5 to 40 mg of KOH/g of solid masked polyisocyanate, and wherein the polyisocyanate (Ba1) is reacted with a less than equimolar quantity of the compounds (Ba2) and (Ba4), and
    completely or partially protonating the cationically solubilized masked polyisocyanate (Ba) by addition of an organic or inorganic acid and then dispersing it in water, thereby forming dispersion (B');
    and the anionically solubilized masked polyisocyanate (Bb) is obtained by reacting prior to dispersing in the aqueous, solvent-free dispersion,
        (Bb1) a polyisocyanate,
        (Bb2) a polyhydric alcohol,
        (Bb3) a compound (B3a) which contains at least one isocyanate-reactive functional group selected from the group consisting of hydroxyl, mercapto, and primary and secondary amino groups, and at least one acid group, and
        (Bb4) a masking compound which contains at least one active hydrogen atom and which is eliminated by baking temperatures, and
    completely or partially ionizing the anionically solubilized masked polyisocyanate (Bb) by addition of an organic or inorganic base and then dispersing it in water, thereby forming dispersion (B').

2. A method as claimed in claim 1, wherein the isocyanate-reactive functional groups of resin (A) are one or more of hydroxyl, amino, and mercapto groups.

3. A method as claimed in claim 1, wherein the masked polyisocyanate (B) is the cationically solubilized isocyanate (Ba).

4. A method, of making an aqueous coating composition comprising:
    forming an aqueous dispersion A' of an amino-epoxy resin (A) having functional groups which react with isocyanate groups, and
    forming an aqueous, solvent-free dispersion B'of a solubilized masked polyisocyanate (B), wherein the polyisocyanate (B) comprises an anionically solubilized masked polyisocyanate (Bb),
    wherein the anionically solubilized masked polyisocyanate (Bb) is obtained by reacting prior to dispersing in the aqueous, solvent-free dispersion,
        (Bb1) a polyisocyanate,
        (Bb2) a polyhydric alcohol,
        (Bb3) a compound (B3a) which contains at least one isocyanate-reactive functional group selected from the group consisting of hydroxyl, mercapto, and primary and secondary amino groups, and at least one acid group, and
        (Bb4) a masking compound which contains at least one active hydrogen atom and which is eliminated by baking temperatures, and
    completely or partially ionizing the anionically solubilized masked polyisocyanate (Bb) by addition of an organic or inorganic base and then dispersing it in water, thereby forming dispersion (B').

5. A method as claimed in claim 3, wherein the cationically masked isocyanate (Ba) is prepared by reacting the polyisocyanate (Ba1), simultaneously or in succession, in bulk or in the melt, with a less than equimolar quantity of the compounds (Ba2) and (Ba4), and the compound (Ba3) is then added in a quantity such that free isocyanate groups are no longer present and that a stable dispersion can be obtained in water without the addition of emulsifiers.

6. A method as claimed in claim 4, wherein the anionically masked polyisocyanate (Bb) is prepared by reacting the polyisocyanate (Bb1), simultaneously or in succession, in bulk or in the melt, with a less than equimolar quantity of the compounds (Bb2) and (Bb4), and the compound (Bb3) is then added in a quantity such that free isocyanate groups are no longer present and that a stable dispersion can be obtained in water without the addition of emulsifiers.

7. A method as claimed in claim 3, wherein the polymeric or oligomeric isocyanate (Ba1) used to prepare component (B) is selected from the group consisting of dimeric isocyanates; trimeric isocyanates; polymeric isocyanates based on diphenylmethane diisocyanate; and allophanates and biurets which result from the reaction of ready-formed urethanes with unreacted isocyanate.

8. A process as claimed in claim 3, wherein the polyhydric alcohol (Ba2) is selected from the group consisting of polyoxyalkylenediols, aliphatic and cycloaliphatic alcohols having 3 to 8 carbon atoms and at least two hydroxyl groups, and reaction products thereof with ethylene oxide and propylene oxide, and mixtures thereof.

9. A process as claimed in claim 4, wherein the polyhydric alcohol (Bb2) is selected from the group consisting of polyoxyalkylenediols, aliphatic and cycloaliphatic alcohols having 3 to 8 carbon atoms and at least two hydroxyl groups, and reaction products thereof with ethylene oxide and propylene oxide, and mixtures thereof.

10. A process as claimed in claim 3, wherein the compound (Ba3) comprises an aliphatic polyamine containing a tertiary amino group and at least one secondary or primary amino group, and having 2 to 10 carbon atoms.

11. A process as claimed in claim 4, wherein the compound (Bb3) is selected from carboxylic acids, sulfonic, sulfinic, phosphonic, and phosphinic acids, having in each case one or more isocyanate-reactive groups selected from among hydroxyl, amino, and mercapto groups.

12. A process as claimed in claim 3, wherein the compound (Ba4) is a masking agent selected from aliphatic and cycloaliphatic alcohols, mono- and oligoalkylene glycol monoethers, lactams, imides, and ketoximes.

13. A process as claimed in claim 4, wherein the compound (Bb4) is a masking agent selected from aliphatic and cycloaliphatic alcohols, mono- and oligoalkylene glycol monoethers, lactams, imides, and ketoximes.

14. A method as claimed in claim 1, wherein the aqueous coating composition is a two-component system comprising separate aqueous dispersions of resin (A') and aqueous solvent-free dispersion (B') of solubilized masked polyisocyanate (B).

15. A method as claimed in claim 1, wherein the aqueous coating composition is a one-component system prepared by mixing the resin component (A) and solubilized masked polyisocyanate (B) in solution or in the melt, optionally removing any non-aqueous solvent, adding an ionizing agent, and conjointly dispersing the mixture of the two components in water.

16. A method of producing a coated article, comprising coating an article with a coating composition produced according to claim 1, and curing the coating by baking.

17. A method of producing a coating article as claimed in claim 16, wherein said coating composition is applied by electrophoretic deposition.

18. A method as claimed in claim 1, wherein the aqueous coating composition is selected from the group consisting of a two-component system prepared by mixing the dispersions of resin (A') and aqueous solvent-free dispersion (B') of solubilized masked polyisocyanate (B) immediately before use and a one-component system prepared by mixing the resin component (A) and solubilized masked polyisocyanate (B) in solution or in the melt, optionally removing any non-aqueous solvent, adding an ionizing agent, and conjointly dispersing the mixture of the two components in water.

* * * * *